United States Patent
Sandstrom

(10) Patent No.: US 7,019,084 B2
(45) Date of Patent: *Mar. 28, 2006

(54) TIRE WITH RUBBER COMPOSITION

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 379 days.

This patent is subject to a terminal disclaimer.

(21) Appl. No.: 10/316,805

(22) Filed: Dec. 11, 2002

(65) Prior Publication Data

US 2004/0116574 A1 Jun. 17, 2004

(51) Int. Cl.
- *C08C 19/00* (2006.01)
- *C08F 236/10* (2006.01)
- *C08K 3/04* (2006.01)
- *C08K 3/36* (2006.01)
- *C08J 3/20* (2006.01)

(52) U.S. Cl. .............. 525/332.6; 525/332.8; 525/333.1; 525/333.2; 525/333.3; 524/492; 524/493; 524/495; 524/496; 523/351

(58) Field of Classification Search .......... 524/492, 524/493, 495, 496; 525/332.8, 333.3, 333.2, 525/333.1, 332.6; 523/351
See application file for complete search history.

(56) References Cited

U.S. PATENT DOCUMENTS

| | | | |
|---|---|---|---|
| 5,100,965 A | 3/1992 | Hsu et al. | 525/249 |
| 6,046,266 A | 4/2000 | Sandstrom et al. | 524/492 |
| 6,103,842 A * | 8/2000 | Halasa et al. | 526/175 |
| 6,211,271 B1 * | 4/2001 | Garro et al. | 524/269 |

FOREIGN PATENT DOCUMENTS

| | | |
|---|---|---|
| DE | 199 59 932 | 12/1999 |
| EP | 0 877 034 | 11/1998 |
| EP | 0972790 | 1/2000 |
| EP | 1167426 | 1/2002 |

OTHER PUBLICATIONS

European Search Report.

* cited by examiner

*Primary Examiner*—Tae H. Yoon
(74) *Attorney, Agent, or Firm*—John D. DeLong

(57) ABSTRACT

The present invention relates to the preparation of rubber compositions for tire tread and tire sidewall component applications. A tire is provided having tread of such composition designed for relatively heavy loads such as, for example, truck tires. A tire having a sidewall of such composition is also provided. Such tire component rubber compositions are of rubber compositions reinforced with precipitated silica and selected carbon black in specified amounts and prepared with a prescribed order of addition to the rubber composition and composed of elastomers as a specific combination of high trans styrene-butadiene rubber with natural or synthetic cis 1,4-polyisoprene rubber and cis 1,4-polybutadiene rubber.

17 Claims, No Drawings

TIRE WITH RUBBER COMPOSITION

FIELD

This invention relates to rubber compositions for tire tread and tire sidewall component applications prepared by a sequential addition of precipitated silica and specified carbon blacks to the rubber composition. In one aspect, the tire tread is designed to be used under relatively heavy loads such as, for example, truck tires. Such tire component rubber compositions are of rubber compositions reinforced with precipitated silica and specified carbon black and composed of specified elastomers.

BACKGROUND

Rubber compositions for tire treads intended for use under heavy loads, such as for example truck tires, may be reinforced with precipitated silica and carbon black and may be composed of various elastomers.

However, for such tires, special considerations usually need to be made for their tire tread rubber compositions.

For example, passenger tire treads are normally used with a desired balance of relatively low rolling resistance for fuel economy, treadwear and relatively high traction for control on the road surface.

However, truck treads are normally designed for use with relatively heavy loads and the traction quality of the rubber composition is usually not as significant since the higher loads placed on the tire itself adds to the traction of the tire tread on the road surface.

Also, significantly, such truck tire treads are usually desirably composed of rubber compositions which are designed to have less internal heat build-up to reduce the running temperature of the tire tread. Such rubber compositions often exhibit less traction between the tread and the road surface, relying more on the load in the tire to enhance the tread's traction characteristic.

Accordingly, for truck tire treads, special attention is normally placed on selection of the rubber reinforcement, including selection of carbon black reinforcement, as well as the selection of elastomers to be used with the specified reinforcement for the reduction in heat build-up quality normally desired.

It is recognized that it is well known to use various materials, and amounts of various individual materials, for tire treads such as, for example, precipitated silica, selected carbon black reinforcement, rubber processing oil, as well as individual elastomers.

However, for truck tire treads, designed to effectively carry large loads, it is considered herein that the selection of materials is more material-specific as well as more combination-of-materials specific.

In another aspect of the invention, tires with sidewalls of a specified rubber composition prepared by a prescribed order of addition of carbon black and precipitated silica is also provided.

For tire sidewalls as well as tire treads, it is recognized that cis 1,4-polybutadiene rubber has been suggested for use in their rubber compositions.

However, it is believed to be generally known that the use of relatively high levels of the cis 1,4-polybutadiene rubber in rubber compositions which also contain a relatively high concentration of carbon black reinforcement usually results in an undesirably low tear resistance (tread strength).

Tear resistance of a rubber composition is usually a very important rubber property for both tire treads and tire sidewalls.

Exemplary of suggestions for use of random high trans styrene-butadiene in various rubber compositions for various tire components, including tire treads, are, for example, U.S. Pat. No. 6,103,842.

This invention is primarily directed to a discovery, for tire tread and for tire sidewall purposes, of the use of material-specific combinations of high trans styrene-butadiene rubber, together with natural rubber or synthetic natural rubber and cis 1,4-polybutadiene rubber in combination with specific particulate reinforcements and processing oil in specified amounts, wherein the precipitated silica and carbon black are required to be provided in a prescribed order of addition. It is believed the described preparation of that such material-specific combinations, which specify defined amounts of such materials, is novel and inventive, particularly for such truck tire treads.

The rubber composition itself, depending largely upon the selection of carbon black, may also be useful as a tire sidewall or other tire components or in rubber tracks, conveyor belts or other industrial product applications.

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

In the description of this invention, the term "phr" if used herein, and according to conventional practice, refers to "parts of a respective material per 100 parts by weight of rubber, or elastomer."

A reference to an elastomer's Tg refers to a "glass transition temperature" which can conveniently be determined by a differential scanning calorimeter at a heating rate of 10° C. per minute.

A polymer's melting point, particularly the said high trans styrene-butadiene unvulcanized polymer, can conveniently be determined by use of a differential scanning calorimeter at a heating rate of about 10° C. per minute. Such method of melting point determination is well known to those skilled in such art.

SUMMARY AND PRACTICE OF THE INVENTION

In accordance with this invention, a method of preparing a rubber composition which comprises, based upon 100 parts by weight (phr) of diene-based elastomers, (A) blending (1) about 20 to about 90 phr of high trans random SBR having a Tg in a range of from about −55° C. to about −85° C.; (2) about 20 to about 60 phr of cis 1,4-polybutadiene rubber having a Tg in a range of about −95° C. to about −110° C.; and (3) about 0 to about 20 phr of cis 1,4-polyisoprene elastomer having a Tg in a range of about −65° C. to about −75° C.; (B) about 40 to about 80 phr of carbon black and precipitated silica reinforcing filler comprised of about 20 to about 60 phr of precipitated silica and about 15 to about 60 phr of carbon black and (C) at least one silica coupling agent having a moiety reactive with silanol groups on the surface of the said silica and an additional moiety interactive with the said elastomers and (D) zero to about 10 phr of rubber processing oil; wherein said method comprises (1) blending said elastomers and said carbon black, exclusive of said silica and of sulfur curative, in an internal rubber mixer in a first preparatory internal rubber mixing stage for a period of about one to about 10 minutes to a temperature in a range of about 150° C. to about 180° C., (2) blending said precipitated silica and silica coupling agent, exclusive of said carbon black and of sulfur curative, in at least one internal rubber mixer in an additional, subsequent preparatory internal rubber mixing stage for a period of about one to about 10 minutes to a temperature of about 150° C. to about 180° C.; wherein said oil, if used, may be added either with the carbon black and/or with the silica, and (3) blending sulfur curative(s) with in an internal rubber mixer in a final internal rubber mixing stage for a period of about one to about 4 minutes to a temperature in a range of about 80° C. to about 130° C.; wherein said rubber composition is removed from said internal rubber mixer at the conclusion of each mixing stage and cooled to a temperature below 40° C.

In further accordance with this invention, a rubber composition prepared by such method is provided.

In additional accordance with this invention, such rubber composition is provided as a sulfur vulcanized rubber composition.

In further accordance with this invention, a rubber composition is provided as being prepared by the method of this invention wherein a tire is provided having a tread of such rubber composition.

In further accordance with this invention, a rubber composition is provided as being prepared by the method of this invention wherein a tire is provided having a sidewall of such rubber composition.

Therefore, in one aspect of the invention a rubber composition is prepared in a sequential series of at least two separate and individual preparatory internal rubber mixing steps, or stages, in which the diene-based elastomer is first mixed with the prescribed carbon black, then adding the silica in a subsequent, separate mixing step and followed by a final mixing step where curatives are blended at a lower temperature and for a substantially shorter period of time.

It is to be understood that in the subsequent, separate mixing step wherein the silica is mixed exclusive of the said carbon black added in the previous step, some small amount of carbon black may nonetheless be present in a silane coupling agent as a carrier. For example, commercial formulations of silane coupling agents as a 50 percent mixture on a carbon black carrier are commonly used for their convenience in a solid form. It is, thus, to be understood that the term "exclusive of said carbon black" does not exclude the presence of a small amount of carbon black as a carrier for silane.

This sequential mixing, which requires the addition of carbon black and silica in separate mixing step, may sometimes be referred to herein as "cascade mixing".

Thus, such mixing method is distinguished from a simple sequential addition of ingredients in a mixing process which utilizes only one preparatory mixing step followed by a final mixing step for addition of curatives. It is required after each mixing step that the rubber mixture is actually removed from the rubber mixer and cooled to a temperature in a range of about 50° C. to about 20° C. and then added back to an internal rubber mixer for the next sequential mixing step, or stage.

In practice, the preferred weight ratio of silica to carbon black for the rubber compositions is from 1/1 to about 3/1.

It is a significant aspect of the invention that, for the preparation of the rubber composition, the carbon black and elastomers are blended in absence of silica and silica coupler following which, and in a separate, subsequent mixing step, the silica and silica coupler are blended with the elastomer/carbon black mixture.

Another significant aspect of the invention is the selection of carbon black in combination with the aforesaid sequential mixing method. In particular, for this invention the first carbon black (a) is required for a tire tread composition and second carbon black (b) is required for a tire outer sidewall rubber composition.

In particular, for this invention carbon black (a) is used for a tire tread rubber composition because it promotes a relatively high modulus and good abrasion resistance for the rubber composition.

Thus, the selection of the carbon black is dependent upon the intended use of the rubber composition.

A further significant aspect of this invention is the material-specific utilization of a prescribed combination of known diene-based elastomers, as in particular, cis 1,4-polyisoprene rubber (natural or synthetic, with natural being preferred) in combination with random high trans styrene-butadiene rubber and cis 1,4-polybutadiene rubber in the tire tread rubber composition in a circumstance where the tire tread rubber is reinforced with precipitated silica with a defined amount of specified carbon black reinforcement and a minimal amount of rubber processing oil, namely a maximum of about 10 phr, and preferably zero phr, of rubber processing oil.

The rubber processing oil restriction is considered herein to be significant because higher levels (amounts) of processing oil are considered herein to have a negative effect on desired abrasion, modulus and tear resistance properties of the rubber composition—which are properties desirable for a tire tread or tire outer sidewall rubber composition.

Use of the cis 1,4-polyisoprene elastomer, particularly natural rubber, having a relatively very low Tg in a range of about −65° C. to about −75° C. is considered beneficial for the tire tread as a potential phase compatibilizer for the material-specific random high trans SBR having a Tg in a range of −55 to −85 ° C. and cis 1,4-polybutadiene rubbers having a Tg in a range of about −95° C. to about −110° C., particularly when the two rubbers are used in combination with each other.

The presence of the random high trans SBR in the tread rubber composition is important because it allows the use of higher levels (amounts) of polybutadiene rubbers for improved wear (DIN abrasion values) without loss of tear resistance.

The use of relatively low levels of the specified carbon black in the prescribed tread rubber composition is important because it promotes relatively high rebound values for enhancing (reducing) tire rolling resistance and tire durability by promoting a reduced heat build-up and, thus, a cooling running temperature, for a tire tread rubber composition.

The selection of a specific, and relatively minimal range of carbon black(s) itself is important because the higher structured (finer particle size) carbon black (a), characterized by having the relatively high DBP value in a range of about 110 to about 160 and an accompanying Iodine number value in a range of 90 to 150, promotes a higher DIN abrasion resistance value for the rubber composition, whereas the lower structured (larger particle size) carbon black (b), characterized by a significantly lower DBP value in a range of about 70 to about 140 and an accompanying Iodine number value of from about 30 to about 90 are considered herein to be better suited for other tire components, particularly an outer sidewall rubber composition as well as industrial products such as belts and hoses.

Representative of such material-specific carbon black (a) for tire treads are, for example N121, N110, and N234. It is to be appreciated that use of such carbon blacks for tire tread rubber compositions itself is not novel. The novelty resides in use of such carbon blacks with the material-specific combination of elastomers as well as the relatively limited use of rubber processing oil in combination of the restrictive method of preparation.

The DBP and Iodine value characterizations for the carbon blacks and the methods for their determination may be readily found in *The Vanderbilt Handbook, Thirteenth Edition* (1990), pages 416–419.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silica, and plasticizers, fillers, pigments, fatty acid, zinc oxide, waxes, antioxidants and antiozonants, peptizing agents and reinforcing materials such as, for example, silica and carbon black. As known to those skilled in the art, depending on the intended use of the sulfur vulcanizable and sulfur-vulcanized material (rubbers), the additives mentioned above are selected and commonly used in conventional amounts.

Suitable HTSBR may be made by any of the suitable solution polymerization methods as are known in the art. In one embodiment, suitable HTSBR may be made using the methods of U.S. Pat. No. 6,103,842. In another embodiment, suitable HTSBR may be made using the methods of U.S. application Ser. No. 10/124,006. Styrene-butadiene rubbers so made may contain from about 2 weight percent to about 50 weight percent styrene and from about 50 weight percent to about 98 weight percent 1,3-butadiene. However, in some cases, the amount of styrene included will be as low as about 1 weight percent. In one embodiment of the present invention, suitable styrene-butadiene rubber so made will contain from about 3 weight percent to about 30 weight percent styrene and from about 70 weight percent to about 97 weight percent 1,3-butadiene. In another embodiment, suitable styrene-butadiene rubber will contain from about 3 weight percent to about 20 weight percent styrene and from about 80 weight percent to about 97 weight percent 1,3-butadiene. In another embodiment, suitable styrene-butadiene rubber will contain from about 3 weight percent to about 10 weight percent styrene and from about 90 weight percent to about 97 weight percent 1,3-butadiene. These styrene-butadiene rubbers typically have a melting point which is within the range of about −10° C. to about 20° C. Higher styrene content HTSBR may exhibit no melting point.

The styrene-butadiene rubber will typically have a glass transition temperature in a range of from about −55° C. to about −85° C.; alternatively from about −65° C. to about −85° C.

In suitable styrene-butadiene rubbers containing less than about 30 weight percent bound styrene, the distribution of repeat units derived from styrene and butadiene is essentially random. The term "random" as used herein means that less than 10 percent of the total quantity of repeat units derived from styrene are in blocks containing more than five styrene repeat units. In other words, more than 90 percent of the repeat units derived from styrene are in blocks containing five or fewer repeat units. About 20% of the repeat units derived from styrene will be in blocks containing only one styrene repeat unit. Such blocks containing one styrene repeat unit are bound on both sides by repeat units which are derived from 1,3-butadiene.

In suitable styrene-butadiene rubbers containing less than about 20 weight percent bound styrene, less than 4 percent of the total quantity of repeat units derived from styrene are in blocks containing five or more styrene repeat units. In other words, more than 96 percent of the repeat units derived from styrene are in blocks containing less than five repeat units. In such styrene-butadiene rubbers, over 25 percent of repeat units derived from styrene will be in blocks containing only one styrene repeat unit, over 60 percent of the repeat units derived from styrene will be in blocks containing less than 3 repeat units and over 90 percent of the repeat units derived from styrene will be in blocks containing 4 or fewer repeat units.

In suitable styrene-butadiene rubbers containing less than about 10 weight percent bound styrene, less than 1 percent of the total quantity of repeat units derived from styrene are in blocks containing 5 or more styrene repeat units. In other words, more than 99 percent of the repeat units derived from styrene are in blocks containing 4 or less repeat units. In such styrene-butadiene rubbers, at least about 50 percent of repeat units derived from styrene will be in blocks containing only one styrene repeat unit and over about 85 percent of the repeat units derived from styrene will be in blocks containing less than 3 repeat units.

Suitable styrene-butadiene copolymers also have a consistent composition throughout their polymer chains. In other words, the styrene content of the polymer will be the same from the beginning to the end of the polymer chain. No segments of at least 100 repeat units within the polymer will have a styrene content which differs from the total styrene content of the polymer by more than 10 percent. Such styrene-butadiene copolymers will typically contain no segments having a length of at least 100 repeat units which have a styrene content which differs from the total styrene content of the polymer by more than about 5 percent.

In the broadest embodiment, suitable HTSBR may be made by any of the suitable solution polymerization methods as are known in the art. In one embodiment, suitable HTSBR may be produced using a process as taught in U.S. application Ser. No. 10/124,006, fully incorporated herein by reference, that comprises copolymerizing styrene and 1,3-butadiene in an organic solvent in the presence of a catalyst system that is comprised of (A) an organolithium compound, (B) a group IIa metal salt selected from the group consisting of group IIa metal salts of amino glycols and group IIa metal salts of glycol ethers, and (C) an organometallic compound selected from the group consisting of organoaluminum compounds and organomagnesium compounds.

In another embodiment, suitable HTSBR may be produced using a process as taught in U.S. Pat. No. 6,103,842, fully incorporated herein by reference, that comprises copolymerizing styrene and 1,3-butadiene under isothermal conditions in an organic solvent in the presence of a catalyst system which consists essentially of (A) an organolithium compound, (B) a barium alkoxide and (C) a lithium alkoxide.

In one embodiment, the rubber composition may comprise between about 20 and about 90 parts by weight of HTSBR, and from about 20 to about 60 phr of cis 1,4-polybutadiene. The composition may also include between zero and up to 20 parts by weight of cis 1,4-polyisoprene, to make up a total 100 parts by weight of elastomer. In another embodiment, the composition comprising between about 20 and about 80 parts by weight of HTSBR comprising between about 3 and 30 percent by weight of styrene.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C.–180° C.) and elevated pressure in a suitable mold. Such practice is well known to those having skill in such art.

Thus, in a more specific aspect of this invention, depending somewhat upon the aforesaid carbon black selection, a tire is provided having a tread component, namely an outer, circumferential tread intended to be ground-contacting, comprised of a rubber composition prepared according to this invention.

In a further aspect of this invention, tires with components other than treads as well as components of industrial products are contemplated.

Representative of such minor amount of additional diene-based elastomers, namely up to a maximum of 5 phr if used at all, are, for example, vinyl polybutadiene rubbers particularly medium to high vinyl polybutadiene rubbers containing about 30 to about 85 percent vinyl 1,2-content, styrene/butadiene copolymers whether prepared by aqueous emulsion or organic solvent polymerization, isoprene/butadiene copolymers, styrene/isoprene copolymers and styrene/isoprene/butadiene terpolymers.

Precipitated silicas are, for example, those obtained by the acidification of a soluble silicate, e.g., sodium silicate. Such precipitated silicas are well known to those having skill in such art.

Such precipitated silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society,* Volume 60, page 304 (1930).

The silica may also be typically characterized by having a dibutylphthalate (DBP) absorption value in a range of about 100 to about 400, and more usually about 150 to about 300.

The silica is conventionally used in conjunction with a silica coupler to connect the silica with the elastomer(s) and, thus, enhance the elastomer reinforcing effect of the silica.

Such coupling agents may, for example, be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in-situ with the silica.

In particular, such coupling agents are sometimes composed of a silane which has a constituent component, or moiety, (the silane portion) capable of reacting with the silica surface, namely, silanol groups on the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

Numerous coupling agents are taught for use in combining silica and rubber such as, for example, silane coupling agents containing a polysulfide component, or structure, such as, for example, a bis(3-alkoxysilylalkyl) polysulfide where the alkyl radicals for the alkoxy group are selected from methyl and ethyl radicals, the alkyl radical for the silane portion are selected from ethyl, propyl and butyl radicals and the polysulfidic bridge contains an average or (a) from 2 to 6, and an average of from 2.1 to 2.8, sulfur atoms or (b) from 2 to 8, and an average of from 3.5 to 4.5 sulfur atoms. A representative example of such coupling agent is bis-(3-triethoxysilylpropyl) polysulfide having (a) from 2 to 6, and an average of from 2.1 to 2.8, sulfur atoms in its polysulfidic bridge or (b) from 2 to 8, and an average of from 3.5 to 4.5 sulfur atoms in its polysulfidic bridge.

An amount of processing aids for a practice of this invention may be about zero to about 10 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr. Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur-vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives, with an exception of the rubber processing oil, are not considered to be an aspect of the present invention which is more primarily directed to the preparation of tire treads of a rubber composition which is quantitatively reinforced with silica, with only a minimum of carbon black, and which contains high trans styrene-butadiene rubber with natural or synthetic cis 1,4-polyisoprene rubber and cis 1,4-polybutadiene rubber, particularly where the prescribed mixing process is used.

The mixing of the rubber composition can preferably be accomplished by the aforesaid cascade mixing process. For example, the ingredients may be mixed in at least three stages, namely, at least two non-productive (preparatory) stage followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

In one aspect of the invention, it is desired to provide a sulfur vulcanized (cured) diene-based rubber compositions which can have the following combination of threshold physical properties for use in tire treads which may sometimes be referred to herein as "Target Properties". Such properties are represented in the following Table A:

TABLE A

| Target Properties | Values |
| --- | --- |
| Modulus, 300%, MPa | at least 7.5, and in a range of 7.5 to 14 |
| Rebound at 100° C. a range | at least 52, and in a range of 52 to 70% |
| Hardness, Shore A (100° C.) | at least 54, and in a range of 54 to 72 |
| Abrasion, DIN (relative volume loss) | maximum of 75, and in a range of 25 to 75 |
| E' at 60° C. (MPa) | at least 10, and in a range of 10 to 30 |
| Tear Resistance, 95° C.(N) | at least 100, and in a range of 100 to 250 |

These Target Properties are considered significant because they relate to desired physical properties, particularly for predicting suitable tire tread performance.

In particular, a modulus of greater than 7.5 MPa (a range of 7.5 to 14 MPa) is important because it is considered herein to relate to better (less) abrasion and better handling characteristics.

A Rebound value at 100° C. of at least 52 percent (a range of 52 to 70 percent) is important because it is considered herein to relate to better (reduced) tire heat build-up and rolling resistance characteristics.

A Shore A hardness value at 100° C. of at least 54 (a range of 54 to 72) is important because it is considered herein to relate to better tire handling and greater abrasion resistance (less wear) characteristics.

A DIN abrasion resistance of a maximum of 75 (range of 25 to 75 relative volume loss) is important because it is considered herein to relate to a better (reduced) treadwear characteristic.

An E' value at 60° C. of greater than 10 MPa (a range of 10 to 30 MPa) is important because it is considered herein to relate to an improved (less) irregular treadwear characteristic. The E' value, as it is well known to those having skill in relevant art, relates to low strain rubber composition stiffness.

The tear resistance (peel adhesion test) value of at least 100 (a range of 100 to 250) is important because it is considered herein to relate to better (reduced) tire tread chip chunking and fatigue wear characteristics.

In practice, while it is considered herein that the above-referenced rubber composition target properties are individually significant for relating to specifically desired tire characteristics, it is a desirable feature of this invention that all of the above target properties are obtained for a rubber composition by the practice of this invention.

The invention may be better understood by reference to the following examples in which the parts and percentages are by weight unless otherwise indicated.

EXAMPLE I

In this example, a cascade mixing procedure was used which involved three separate, sequential mixing stages of addition of materials (in an internal rubber mixer), namely, two sequential non-productive stages followed by a productive mix. In particular, for the first non-productive stage, elastomers were mixed with the carbon black and other compounding materials for about three minutes to a temperature of about 160° C. In the second, sequential, non-productive mixing stage, silica and coupling agent are added to the composition obtained from the first non-productive stage while mixing for about three minutes to a temperature of 160° C. The composition from the second non-productive stage was then mixed in a final productive stage with curatives for a period of about two minutes to a temperature of about 120° C.

Table 1 illustrates the ingredients used for preparing the rubber compositions of Samples 1 through 6. Table 2 illustrates the results of physical property measurements on each sample done using standard techniques.

TABLE 1

| 1st Non-Productive | |
| --- | --- |
| Elastomers | 100 |
| Carbon Black[1] | 30 |
| Aromatic Oil[2] | 5 |
| Wax[3] | 0.5 |
| Zinc Oxide | 3 |
| Fatty Acid[4] | 3 |
| 2nd Non-Productive Mixing | |
| Silica[5] | 30 |
| Coupling Agent[6] | 6 |
| Aromatic Oil | 3 |
| Antidegradants[7] | 2.5 |
| Productive | |
| Accelerators[8] | 1.7 |
| Sulfur | 1.4 |
| Antidegradents[7] | 1 |

[1]N121 SAF carbon black
[2]Sundex 8125 from Sun Oil
[3]Mixture of microcrystalline and paraffin wax
[4]Primarily stearic acid, but also palmitic and oleic acids
[5]Zeosil 1156MP from Rhone-Poulenc
[6]X50S from DeGussa GmbH, as a 50/50 mixture of bis(3-triethoxysilylpropyl) tetrasulfide and carbon black
[7]amine type antioxidants/antiozonants
[8]mixture of sulfenamide accelerator and diphenylguanidine

TABLE 2

| | Sample | | | | | |
|---|---|---|---|---|---|---|
| | 1 Control | 2 Control | 3 Control | 4 | 5 | 6 |
| Elastomers | | | | | | |
| High trans SSBR[1] | 0 | 0 | 0 | 100 | 80 | 60 |
| Conventional SSBR[2] | 100 | 80 | 60 | 0 | 0 | 0 |
| Cis 1,4-polybutadiene[3] | 0 | 20 | 40 | 0 | 20 | 40 |
| Rheometer, 150° C. | | | | | | |
| Max. Torque, dNm | 2.8 | 23.5 | 23.4 | 23.7 | 24.5 | 22.9 |
| Min. Torque, dNm | 3.56 | 2.75 | 2.14 | 3.31 | 3.45 | 3.39 |
| Delta Torque, dNm | 19.3 | 20.7 | 21.2 | 20.4 | 21.1 | 19.6 |
| $T_{90}$, minutes | 21.5 | 20.8 | 20.4 | 18.8 | 19.9 | 21.1 |
| Stress-Strain | | | | | | |
| Tensile Strength, MPa | 21.2 | 20.4 | 17.8 | 22.1 | 21.6 | 19.5 |
| Elongation @ Break, % | 483 | 479 | 458 | 510 | 512 | 510 |
| 100% Modulus | 2.5 | 2.5 | 2.5 | 2.2 | 2.2 | 2.3 |
| 300% Modulus | 11.3 | 11.1 | 10.4 | 10.2 | 10.0 | 9.3 |
| Rebound | | | | | | |
| 100° C., % | 60.7 | 60.9 | 61.2 | 57 | 58 | 59 |
| Hardness | | | | | | |
| Shore A, 100° C. | 65.8 | 66.1 | 66.2 | 65 | 66 | 64 |
| Rheovibron | | | | | | |
| E' @ 60° C. | 12.5 | 13.8 | 13.2 | 13.7 | 13.2 | 13 |
| Tan.Delta @ 60° C. | 0.157 | 0.151 | 0.161 | 0.174 | 0.168 | 0.166 |
| Abrasion | | | | | | |
| DIN | 91 | 80 | 69 | 65 | 56 | 50 |
| Tear Resistance (N) | | | | | | |
| Peel Adhesion, 95° C. | 84 | 85 | 94 | 157 | 143 | 146 |

[1]Solution SBR, 8% styrene, 73% trans, 16% cis, 4% vinyl, 70 Mooney, Tg −76 C., Tm 13° C.
[2]SLF1810 from the Goodyear Tire & Rubber Company
[3]High cis 1,4-polybutadiene rubber (BUDENE ® 1208) from The Goodyear Tire & Rubber Company.

As is evident from the data of Table 2, the use of the random high trans SBR in combination with polybutadiene results in rubber composition having superior tear and abrasion as compared with rubber compositions having a conventional SSBR with polybutadiene. For example, Samples 4–6 show surprisingly high value of peel adhesion and low values of DIN abrasion as compared with the control Samples 1–3.

EXAMPLE 2

In this example, a cascade mixing procedure was used which involved four separate, sequential mixing stages of addition of materials (in an internal rubber mixer), namely, three sequential non-productive stages followed by a productive mix. In particular, for the first non-productive stage, elastomers were mixed with the carbon black and other compounding materials for about three minutes to a temperature of about 160° C. In the second, sequential, non-productive mixing stage, one half of the silica and coupling agent are added to the composition obtained from the first non-productive stage while mixing for about three minutes to a temperature of 160° C. In the third, sequential, non-productive mixing stage, the other half of the silica and coupling agent are added to the composition obtained from the first non-productive stage while mixing for about three minutes to a temperature of 160° C. The composition from the second non-productive stage was then mixed in a final productive stage with curatives for a period of about two minutes to a temperature of about 120° C.

Table 3 illustrates the ingredients used for preparing the rubber compositions of Samples 7 through 12. Table 4 illustrates the results of physical property measurements on each sample done using standard techniques.

TABLE 3

| 1st Non-Productive | |
|---|---|
| Elastomers | 100 |
| Carbon Black[1] | 30 |
| Aromatic Oil[2] | 5 |
| Wax[3] | 0.5 |
| Zinc Oxide | 3 |
| Fatty Acid[4] | 3 |
| 2nd Non-Productive Mixing | |
| Silica[5] | 15 |
| Coupling Agent[6] | 3 |
| Antidegradants[7] | 1.25 |
| 3rd Non-Productive Mixing | |
| Silica[5] | 15 |
| Coupling Agent[6] | 3 |
| Antidegradants[7] | 1.25 |

TABLE 3-continued

| Productive | |
|---|---|
| Accelerators[8] | 1.7 |
| Sulfur | 1.4 |
| Antidegradents[7] | 1 |

1.–7. SeeTable 1.

TABLE 4

| | Sample | | | | | |
|---|---|---|---|---|---|---|
| | 7 | 8 | 9 | 10 | 11 | 12 |
| Elastomers | | | | | | |
| High trans SSBR[1] | 60 | 40 | 20 | 20 | 40 | 80 |
| Natural Rubber[2] | 0 | 0 | 0 | 20 | 20 | 20 |
| Cis 1,4-polybutadiene[3] | 40 | 60 | 80 | 60 | 40 | 0 |
| Properties | | | | | | |
| Rheometer, 150° C. | | | | | | |
| Max. Torque, dNm | 24.8 | 25.8 | 26.4 | 23.6 | 23.7 | 23.3 |
| Min. Torque, dNm | 1.81 | 3.51 | 4.3 | 3.58 | 3.89 | 2.99 |
| Delta Torque, dNm | 23 | 22.3 | 22.1 | 20 | 19.8 | 20.4 |
| $T_{90}$, minutes | 14.3 | 13.9 | 13.7 | 13.9 | 14.7 | 15.3 |
| Stress-Strain | | | | | | |
| Tensile Strength, MPa | 21.1 | 18 | 17.8 | 18.5 | 20 | 22 |
| Elongation @ Break, % | 429 | 390 | 415 | 430 | 438 | 440 |
| 100% Modulus | 2.67 | 2.81 | 2.77 | 2.65 | 2.69 | 2.55 |
| 300% Modulus | 13.8 | 13.6 | 12.5 | 12.5 | 13.2 | 13.9 |
| Rebound | | | | | | |
| 100° C., % | 60.9 | 61.5 | 61.6 | 63.1 | 61.9 | 59.9 |
| Hardness | | | | | | |
| Shore A, 100° C. | 68.2 | 68.8 | 68.5 | 66.6 | 67.1 | 66.8 |
| Rheovibron | | | | | | |
| E' @ 60° C. | 15.6 | 14.9 | 14.8 | 13.4 | 14 | 14.1 |
| Tan.Delta @ 60° C. | 0.157 | 0.155 | 0.153 | 0.142 | 0.148 | 0.163 |
| Abrasion | | | | | | |
| DIN | 47 | 47 | 44 | 58 | 66 | 72 |
| Tear Resistance (N) | | | | | | |
| Peel Adhesion, 95° C. | 128 | 119 | 112 | 125 | 125 | 130 |

[1]Solution SBR, 8% styrene, 73% trans, 16% cis, 4% vinyl, 70 Mooney, Tg −76° C., Tm 13° C.
[2]SMR20
[3]High cis 1,4-polybutadiene rubber (BUDENE ® 1208) from The Goodyear Tire & Rubber Company.

As is evident from the data of Table 4, increasing the amount of polybutadiene in a rubber composition comprising polybutadiene and random high trans SBR results in a decrease in the peel adhesion (Samples 7–9). However, the addition of a small amount of natural rubber (Samples 10–12) results in an increase in peel adhesion as compared to Samples 7–9, with an acceptable level of abrasion.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a rubber composition which comprises, based upon 100 parts by weight (phr) of diene-based elastomers, blending (A) (1) about 20 to about 90 phr of high trans random SBR having a Tg in a range of from about −55° C. to about −85° C. wherein said high trans random SBR is produced by a process that comprises copolymerizing styrene and 1,3-butadiene in an organic solvent at a temperature that is within the range of about 40° C. to about 120° C. in the presence of a catalyst system that is comprised of (A) an organolithium compound, (B) a group IIa metal salt selected from the group consisting of group IIa metal salt of an amino glycol, and (C) an organometallic compound selected from the group consisting of organoaluminum compounds containing less than 13 carbon atoms and organomagnesium compounds;

(2) about 20 to about 60 phr of cis 1,4-polybutadiene rubber having a Tg in a range of about −95° C. to about −110° C.; and (3) about 0 to about 20 phr of cis 1,4-polyisoprene elastomer having a Tg in a range of about −65° C. to about −75° C.;

(B) about 40 to about 80 phr of carbon black and precipitated silica reinforcing filler comprised of about 20 to about 60 phr of precipitated silica and about 15 to about 60 phr of carbon black and (C) at least one silica coupling agent having a moiety reactive with silanol groups on the surface of the said silica and an additional moiety interactive with the said elastomers and (D) zero to about 10 phr of rubber processing oil;

wherein said method comprises (1) blending said elastomers and carbon black, exclusive of said silica and of sulfur curative, in an internal rubber mixer in a first preparatory internal rubber mixing stage for a period of about one to about 10 minutes to a temperature in a range of about 150° C. to about 180° C., (2) blending said precipitated silica and silica coupling agent, exclusive of said carbon black and of sulfur curative, in at least one internal rubber mixer in an additional, subsequent preparatory internal rubber mixing stage for a period of about one to about 10 minutes to a temperature of about 150° C. to about 180° C.; wherein said oil, if used, may be added either with the carbon black and/or with the silica, and (3) blending sulfur curative(s) with in an internal rubber mixer in a final internal rubber mixing stage for a period of about one to about 4 minutes to a temperature in a range of about 80° C. to about 130° C.; wherein said rubber composition is removed from said internal rubber mixer at the conclusion of each mixing stage and cooled to a temperature below 40° C.

2. The method of claim 1 wherein said coupling agent is a bis(3-trialkoxysilylalkyl) polysulfide wherein the alkyl radicals of the alkoxy groups are selected from methyl and ethyl radicals, the alkyl radical of the silane portion is selected from ethyl, propyl and butyl radicals; and wherein the polysulfide bridge contains (a) from 2 to 6, and an average of from 2.1 to 2.8, sulfur atoms or (b) from 2 to 8, and an average of from 3.5 to 4.5, sulfur atoms.

3. The method of claim 1, wherein said high trans random SBR comprises from about 3 to about 30 percent by weight of styrene.

4. The method of claim 1, wherein said high trans random SBR comprises from about 3 to about 20 percent by weight of styrene.

5. The method of claim 1, wherein said high trans random SBR comprises from about 3 to about 10 percent by weight of styrene.

6. The method of claim 1, wherein said high trans random SBR has a trans content of greater than 60 percent by weight.

7. The method of claim 1, wherein said high trans random SBR has a trans content of greater than 70 percent by weight.

8. The method of claim 1, wherein less than 10 percent of the total quantity of repeat units derived from styrene in said high trans random SBR are in blocks containing more than five styrene repeat units.

9. The method of claim 1, wherein less than 4 percent of the total quantity of repeat units derived from styrene in said high trans random SBR are in blocks containing 5 or more styrene repeat units.

10. The method of claim 1, wherein less than 1 percent of the total quantity of repeat units derived from styrene in said high trans random SBR are in blocks containing 5 or more styrene repeat units.

11. The method of claim 1, wherein said carbon black is selected from a first carbon black having a DBP value in a range of about 100 to about 150 cc/100 gm and an Iodine Number in a range of about 90 to about 150 g/kg or a second carbon black having a DBP value in a range of about 65 to about 130 cc/100 gm and an Iodine Number in a range of about 25 to about 85 g/kg.

12. A pneumatic tire comprising at least one component, said component comprising a rubber composition made by the method of claim 1.

13. The pneumatic tire of claim 12, wherein said at least one component is a tread.

14. The pneumatic tire of claim 12, wherein said at least one component is a sidewall.

15. A pneumatic tire comprising at least one component, said component comprising a rubber composition made by the method of claim 11.

16. The pneumatic tire of claim 15, wherein said at least one component is a tread and said carbon black has a DBP value in a range of about 100 to about 150 cc/100 gm and an Iodine Number in a range of about 90 to about 150 g/kg.

17. The pneumatic tire of claim 15, wherein said at least one component is a sidewall and said carbon black has a DBP value in a range of about 65 to about 130 cc/100 gm and an Iodine Number in a range of about 25 to about 85 g/kg.

* * * * *